US012414487B2

(12) United States Patent
Steinlage et al.

(10) Patent No.: US 12,414,487 B2
(45) Date of Patent: Sep. 16, 2025

(54) DUAL BASKET ATTACHMENT

(71) Applicant: Deere & Company, Moline, IL (US)

(72) Inventors: David L. Steinlage, Ankeny, IA (US); Shawn J. Becker, Ankeny, IA (US); Greg T. Buse, Ankeny, IA (US); Mark D. Beeck, Ankeny, IA (US); Luc Janelle, Ankeny, IA (US); Andrew J. Peterson, Ankeny, IA (US); John W. Gisler, Ankeny, IA (US); Brian McEvoy, Eden Prairie, MN (US); Narayanan Esakkimuthu, Pune (IN)

(73) Assignee: Deere & Company, Moline, IL (US)

( * ) Notice: Subject to any disclaimer, the term of this patent is extended or adjusted under 35 U.S.C. 154(b) by 520 days.

(21) Appl. No.: 17/205,896

(22) Filed: Mar. 18, 2021

(65) Prior Publication Data
US 2021/0315144 A1    Oct. 14, 2021

Related U.S. Application Data

(63) Continuation of application No. 16/007,365, filed on Jun. 13, 2018, now Pat. No. 10,952,362.

(60) Provisional application No. 62/527,689, filed on Jun. 30, 2017.

(51) Int. Cl.
*A01B 29/04* (2006.01)
*A01B 27/00* (2006.01)
A01B 49/02 (2006.01)

(52) U.S. Cl.
CPC .......... *A01B 29/048* (2013.01); *A01B 27/005* (2013.01); *A01B 49/027* (2013.01)

(58) Field of Classification Search
CPC .......................... A01B 49/027; A01B 27/005
See application file for complete search history.

(56) References Cited

U.S. PATENT DOCUMENTS

| 3,220,488 | A |   | 11/1965 | Becker |
|---|---|---|---|---|
| 4,280,564 | A |   | 7/1981 | van der Lely |
| 4,342,365 | A |   | 8/1982 | van der Lely |
| 4,418,761 | A | * | 12/1983 | Dietrich, Sr. ........ A01B 61/042 |
|   |   |   |   | 172/551 |
| 7,766,093 | B2 | * | 8/2010 | Becker .................. A01B 63/32 |
|   |   |   |   | 172/133 |
| 8,020,629 | B1 |   | 9/2011 | McFarlane et al. |
| 8,636,078 | B2 | * | 1/2014 | Yuen ...................... F15B 11/20 |
|   |   |   |   | 172/311 |
| 9,398,738 | B2 |   | 7/2016 | Achten |

(Continued)

Primary Examiner — Christopher J Sebesta

(57) ABSTRACT

An implement has an implement frame and a wheel for supporting the implement frame on a ground surface for movement in a direction of travel. The implement also includes a first basket coupled to the implement frame by a first arm and configured to work a portion of the ground surface, and a second basket coupled to the implement frame by a second arm and positioned rearward of the first basket relative to the direction of travel. The second basket is configured to work the portion of the ground surface after the first basket. A hydraulic cylinder is operatively coupled to the first arm and/or the second arm and configured to lift and lower the respective basket with respect to the ground surface to and from a raised position for travel. The hydraulic cylinder is further configured to regulate a pressure of the respective basket against the portion of the ground surface.

15 Claims, 17 Drawing Sheets

(56) References Cited

U.S. PATENT DOCUMENTS

| | | | |
|---|---|---|---|
| 9,521,798 B2* | 12/2016 | Kovach | A01B 63/32 |
| 10,681,852 B2* | 6/2020 | Roberge | A01B 45/02 |
| 10,918,006 B2* | 2/2021 | Shearer | A01C 7/006 |
| 2003/0196823 A1* | 10/2003 | McDonald | A01B 25/00 |
| | | | 172/146 |
| 2010/0198529 A1 | 8/2010 | Sauder et al. | |
| 2014/0262379 A1 | 9/2014 | Landoll et al. | |
| 2016/0044857 A1* | 2/2016 | Sporrer | A01B 63/32 |
| | | | 172/140 |
| 2017/0049037 A1 | 2/2017 | Hilvers et al. | |
| 2017/0079192 A1 | 3/2017 | Steinlage et al. | |

\* cited by examiner

DUAL BASKET ATTACHMENT

CROSS REFERENCE TO RELATED APPLICATION

This application is a continuation of U.S. Non-Provisional patent application Ser. No. 16/007,365, filed, Jun. 13, 2018, which claims priority to U.S. Provisional Application No. 62/527,689, filed Jun. 30, 2017, the entire contents of which are herein incorporated by reference.

BACKGROUND

The present disclosure relates to an attachment for an implement such as a tillage tool.

SUMMARY

In one aspect, the disclosure provides an implement including an implement frame, and a wheel for supporting the implement frame on a ground surface for movement in a direction of travel. The implement also includes a first basket coupled to the implement frame by a first arm. The first basket is configured to work a portion of the ground surface. The implement also includes a second basket coupled to the implement frame by a second arm and positioned rearward of the first basket relative to the direction of travel. The second basket is configured to work the portion of the ground surface after the first basket has worked the portion of the ground surface. The implement also includes a hydraulic cylinder operatively coupled to the first arm and/or the second arm and configured to lift and lower the respective basket with respect to the ground surface to and from a raised position for travel. The hydraulic cylinder is further configured to regulate a pressure of the respective basket against the portion of the ground surface.

In another aspect, the disclosure provides an implement including an implement frame, and a wheel for supporting the implement frame on a ground surface for movement in a direction of travel. The implement also includes a first basket coupled to the implement frame by a first arm. The first basket is configured to work a portion of the ground surface. The implement also includes a second basket coupled to the implement frame by a second arm and positioned rearward of the first basket relative to the direction of travel. The second basket is configured to work the portion of the ground surface after the first basket has worked the portion of the ground surface. The implement also includes a hydraulic cylinder operatively coupled to the first arm and/or the second arm and configured to regulate a pressure of the respective basket against the portion of the ground surface.

In yet another aspect, the disclosure provides an implement including an implement frame, and a wheel for supporting the implement frame on a ground surface for movement in a direction of travel. The implement also includes a first basket coupled to the implement frame by a first arm. The first basket is configured to work a portion of the ground surface. The implement also includes a second basket coupled to the implement frame by a second arm and positioned rearward of the first basket relative to the direction of travel. The second basket is configured to work the portion of the ground surface after the first basket has worked the portion of the ground surface. The implement also includes a hydraulic cylinder operatively coupled to the first arm and/or the second arm and configured to lift and lower the respective basket between a raised position for travel and a lowered position for operation.

In yet another aspect, the disclosure provides an implement including an implement frame, and a wheel for supporting the implement frame on a ground surface for movement in a direction of travel. The implement also includes a first basket coupled to the implement frame by a first arm. The first basket is configured to work a portion of the ground surface. The first basket also includes a second basket coupled to the implement frame by a second arm and positioned rearward of the first basket relative to the direction of travel. The second basket is configured to work the portion of the ground surface after the first basket has worked the portion of the ground surface. The implement also includes a first hydraulic cylinder operatively coupled to the first arm, and a second hydraulic cylinder operatively coupled to the second arm. The first and second hydraulic cylinders are independently operable to lift and lower the respective baskets between a raised position spaced above the ground surface for travel and a lowered position in engagement with the ground surface for operation.

Implements such as tillage tools can be used to break up soil clods, remove weeds, and cover seed. Both shank style and disk blade style tillage tools can create soil profiles in the soil having convolutions of laterally spaced hills and valleys commonly described as shank tracks on shank machines or disk blade marks on disk style machines. These convolutions of the soil can be undesirable to plant into, so various harrows have been designed and utilized on shank style tillage machines and on disk blade style tillage machines to level these convolutions out prior to planting. In high residue conditions, several of the current harrow solutions in the market today either struggle to do a good job of leveling the soil surface out or they struggle to flow residue evenly while leveling the soil surface. The present application provides a unique solution to level low to high residue seedbeds without creating residue bunching.

In some embodiments, the disclosure provides a vehicle and implement mounted thereto. The vehicle and implement include a first wheel coupled to the vehicle for supporting the vehicle on soil, a second wheel coupled to the implement for supporting the implement on the soil, and a motor for driving the vehicle and guiding the implement on the first and second wheels in a direction of travel. The vehicle and implement further including an implement frame supported by the second wheel, a first basket coupled to the implement frame, the first basket configured to work the soil such that any convolutions in the soil are reoriented to be substantially perpendicular to the direction of travel of the vehicle and implement, and a second basket coupled to the implement frame and positioned rearward of the first basket in the direction of travel, the second basket configured to work the soil such that the convolutions in the soil that are substantially perpendicular to the direction of travel of the vehicle and implement are flattened.

In some embodiments, the disclosure provides an implement having an implement frame, a wheel for supporting the implement frame on soil in a direction of travel, a first basket coupled to the implement frame, and a second basket coupled to the implement frame. The first basket works the soil such that any convolutions in the soil are reoriented to be substantially perpendicular to the direction of travel of the implement. The second basket is positioned rearward of the first basket, and works the soil such that the convolutions in the soil that are substantially perpendicular to the direction of travel of the implement are flattened.

In some embodiments, the disclosure provides a method of flattening convolutions in soil including reorienting convolutions in the soil that are substantially parallel to a direction of travel of an implement such that the reoriented convolutions are substantially perpendicular to the direction of travel of the implement by moving a first basket across the soil, and flattening the reoriented convolutions in the soil by moving a second basket across the soil.

In some embodiments, the disclosure provides a tillage tool including a frame, at least one disc, and at least one wheel to which a dual basket attachment is coupled. The frame can include a main portion, a first lateral portion, and a second lateral portion. The frame can also include more side portions in some embodiments. The dual basket attachment includes a front basket and a rear basket. The front basket operates in a passive orientation such that soil is smoothed rather than thrown. The front basket includes knife blades arranged in straight bars. The rear basket follows the front basket and further levels soil to flatten the soil profile. The rear basket can be a round or flat bar basket.

In some embodiments, the disclosure provides a dual basket attachment having a front basket and a rear basket. The front basket operates in a passive orientation such that soil is smoothed rather than thrown. The front basket includes knife blades arranged in straight bars. The rear basket follows the front basket and further levels soil to flatten the soil profile. The rear basket can be a round or flat bar basket.

In some embodiments, the disclosure provides a method of flattening convolutions in the soil profile by reorienting disc blade hills and valleys that are generally parallel to the direction of travel to knife-edge hills and valleys that are generally perpendicular to the direction of travel. Then, the knife-edge hills and valleys are smoothed such that the soil profile is flattened.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings, and the terms "connected" and "coupled" and variations thereof are not restricted to physical or mechanical connections or couplings. Also, it is to be understood that phraseology and terminology used herein with reference to device or element orientation (such as, for example, terms like "front", "back", "up", "down", "top", "bottom", and the like) are only used to simplify description of the present disclosure, and do not alone indicate or imply that the device or element referred to must have a particular orientation. In addition, terms such as "first", "second", and "third" are used herein and in the appended claims for purposes of description and are not intended to indicate or imply relative importance or significance.

In some embodiments, a dual basket attachment can be used in conjunction with a vehicle such as a tractor and an implement such as a tillage tool. The tillage tool can be a harrow that includes a frame, at least one disc or disc gang, and at least one wheel. The tillage tool can also include at least one of some variation of actuator such as a hydraulic cylinder regulated by a control system.

Figure 1:
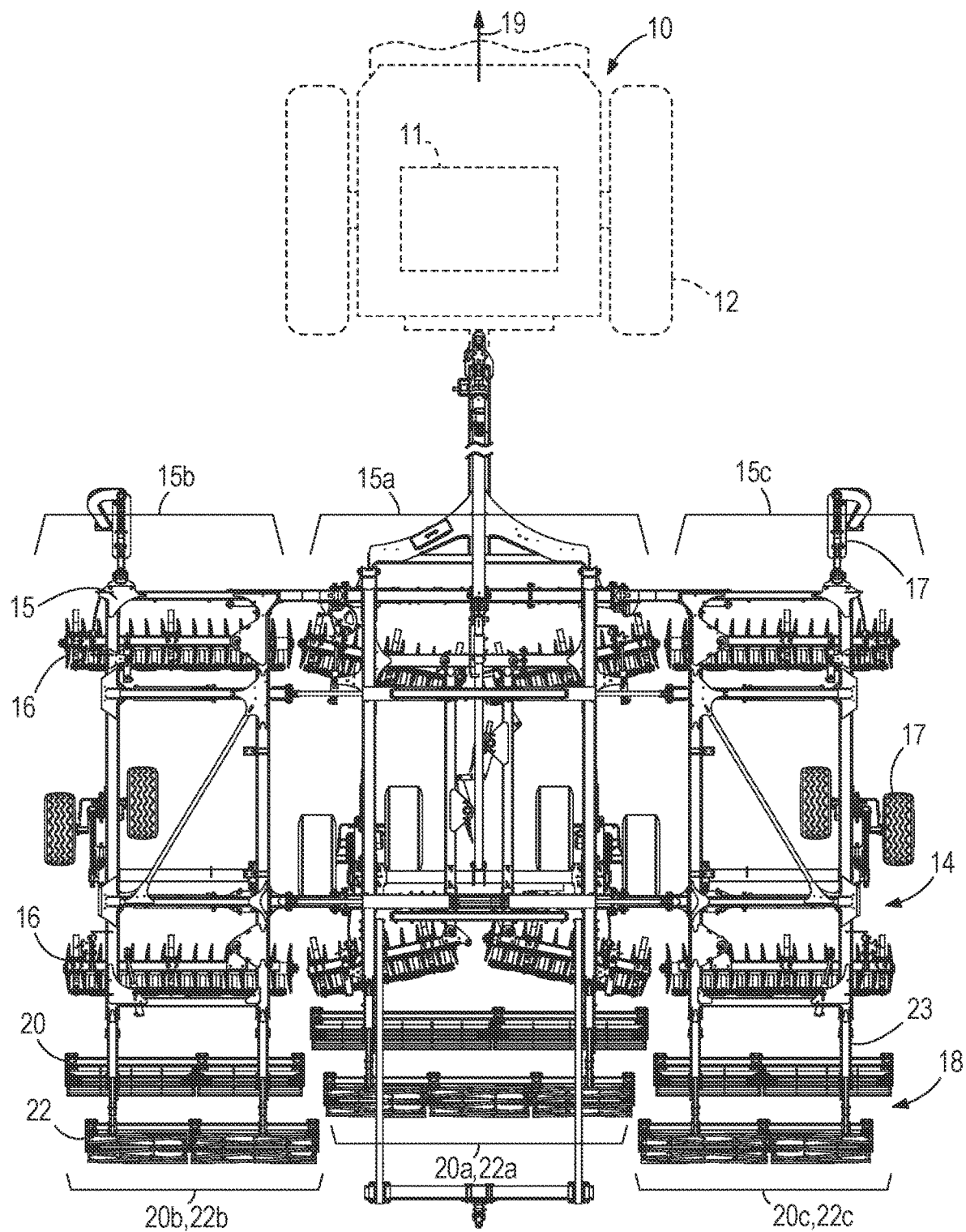
FIG. 1 is a top view of a tractor having a tillage tool and a dual basket attachment according to some embodiments.

FIG. 1 illustrates one such possible embodiment. The illustrated embodiment includes a tractor 10 having a motor 11 for driving the tractor 10 and a plurality of tractor wheels 12 for supporting the tractor 10 on ground that is typically soil. A tillage tool 14 is coupled to the tractor 10. The tillage tool 14 includes a frame 15 having a main portion 15a, a left-side or first lateral portion 15b, and a right-side or second lateral portion 15c. The tillage tool 14 includes rows of disc gangs 16 and rows of wheels 17. The disc gangs 16 are configured to create convolutions in soil such that the convolutions are oriented substantially parallel to a direction of travel 19. A dual basket attachment 18 includes a front basket 20, a rear basket 22, and a coupling bar 23. The coupling bar 23 couples the dual basket attachment 18 to the back of the tillage tool 14. The illustrated front basket 20 and rear basket 22 have a main section 20a and 22a, a left-side or first lateral section 20b and 22b, and a right-side or second lateral section 20c and 22c. The aforementioned sections of the front basket 20 and rear basket 22 are staggered. Other embodiments of the dual basket attachment 18 can include fewer or more sections. For example, the tillage tool 14 may include only one frame portion 15 with associated disc gangs 16 and wheels 17, and the dual basket attachment 18 may include one front basket 20 and one rear basket 22.

In the illustrated embodiment of FIG. 1, the tractor 10 is generally in front of the tillage tool 14 and the tillage tool 14 is generally in front of the dual basket attachment 18 oriented in the direction of travel 19. FIG. 1 also illustrates an example of the placement of each front basket 20 or front basket section relative to each rear basket 22 or rear basket section. Each front basket 20 is generally in front of the associated rear basket 22 such that each front basket 20 traverses the soil before the rear basket 22 during operation.

Figure 2:
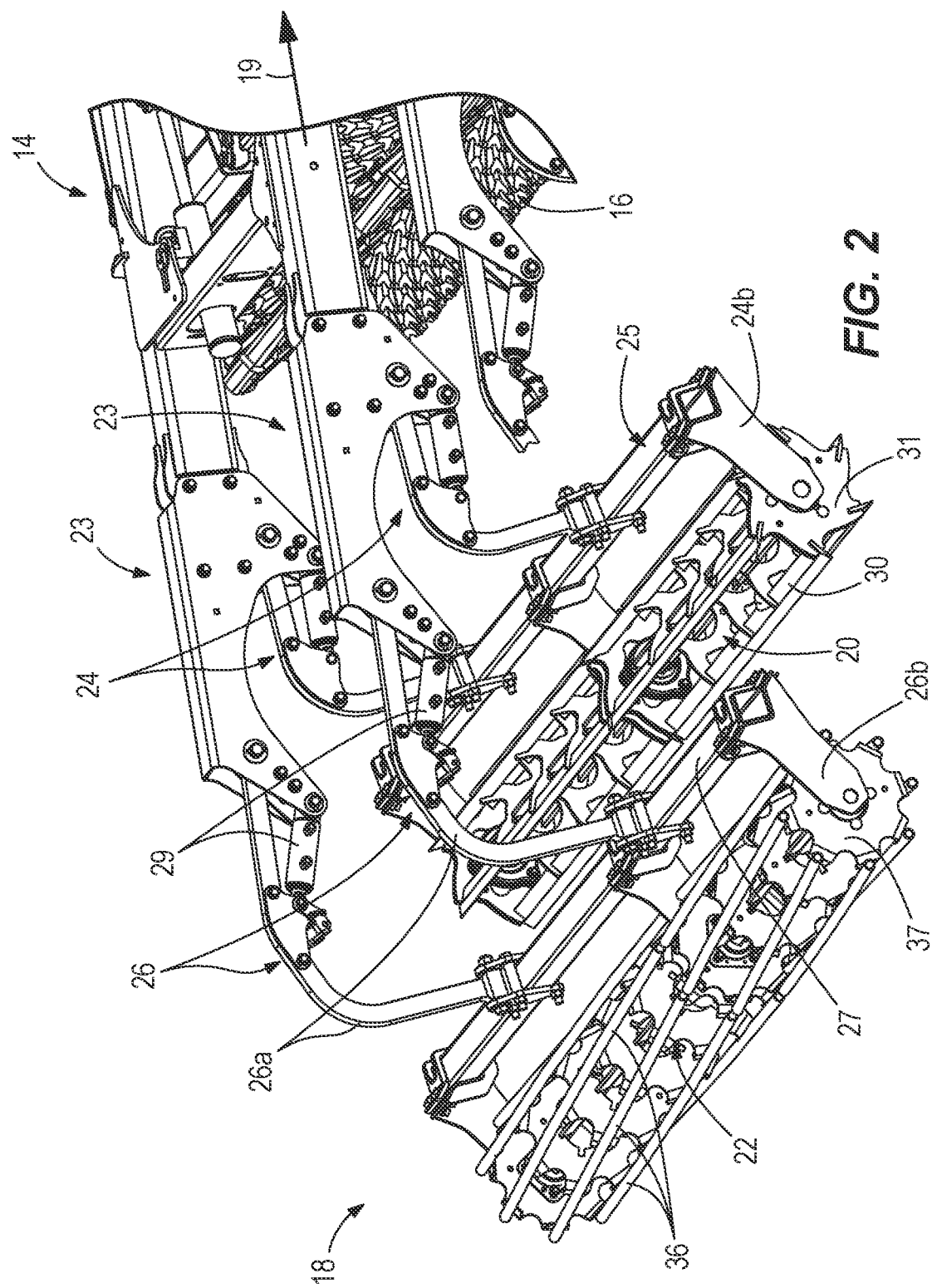
FIG. 2 is a partial rear view of the tillage tool and the dual basket attachment of FIG. 1.
Figure 3:
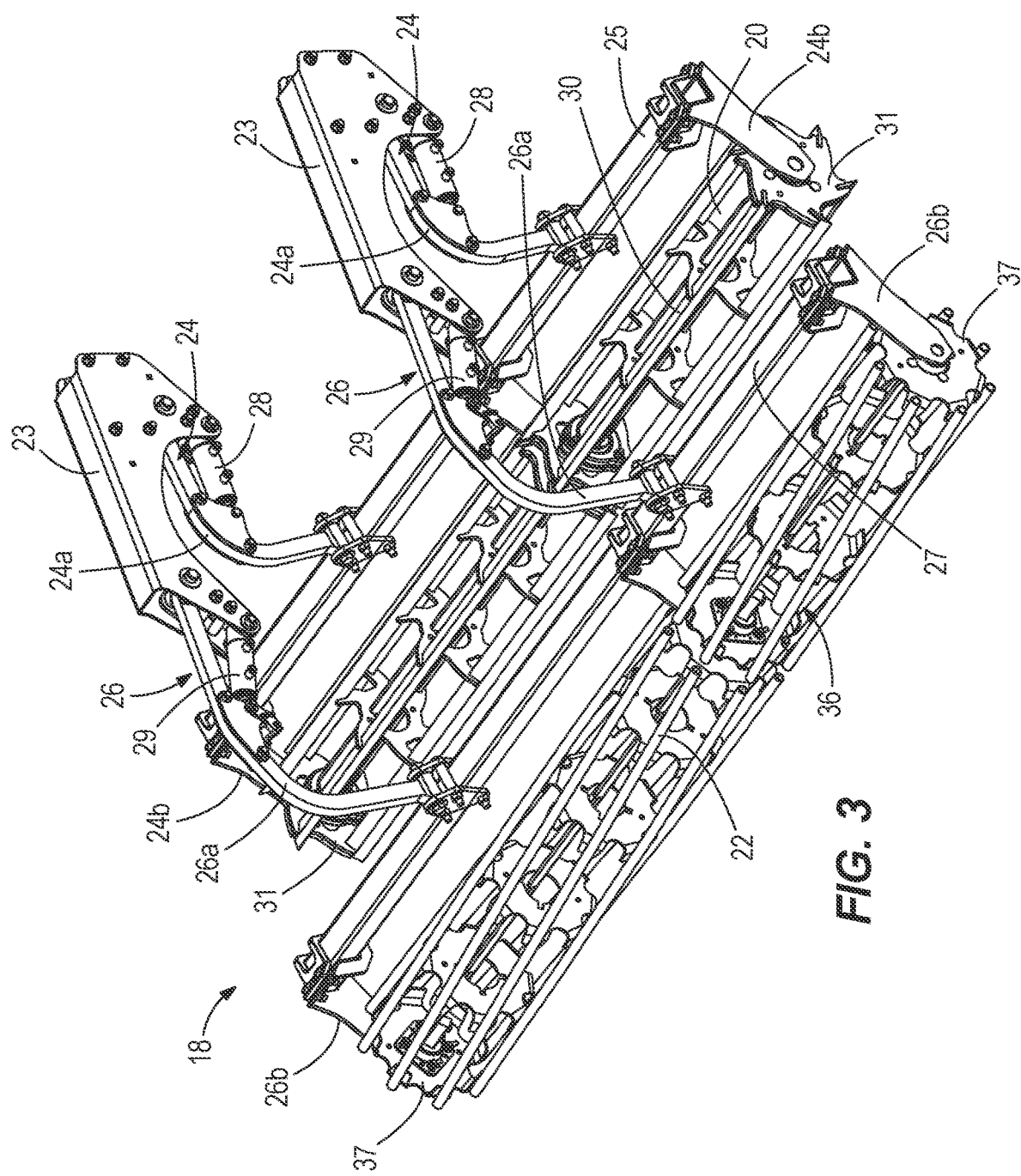
FIG. 3 is a partial perspective view of the dual basket attachment of FIG. 2.

FIGS. 2 and 3 illustrate one possible embodiment of the dual basket attachment 18 in greater detail. The coupling bar 23 is coupled to the back of the tillage tool 14. The front basket 20 is coupled to the coupling bar 23 by first arms 24 and the rear basket 22 is coupled to the coupling bar 23 by second arms 26. The first arms 24 include a first section 24a and a second section 24b. The first section 24a and second section 24b are connected by a rocker bar 25 as shown in FIGS. 2 and 3. The second arms 26 also include a first section 26a and a second section 26b. The first section 26a and second section 26b are also connected by a rocker bar 27 as shown in FIGS. 2 and 3. The first arms 24 are operated, respectively, by first hydraulic cylinders 28 and the second arms 26 are operated, respectively, by second hydraulic cylinders 29. In some embodiments of the dual basket attachment 18, the hydraulic cylinders 28 and 29 can be controlled by a single hydraulic circuit. Other possible embodiments include each set of hydraulic cylinders 28, 29 operating separately or any of the hydraulic cylinders 28, 29 operating individually. The first arms 24 and second arms 26 regulate the pressure at which the respective front basket 20 and rear basket 22 press against the ground while in operation. The hydraulic cylinders 28 and 29 can be operated by a control system within the tractor 10.

Figure 4:
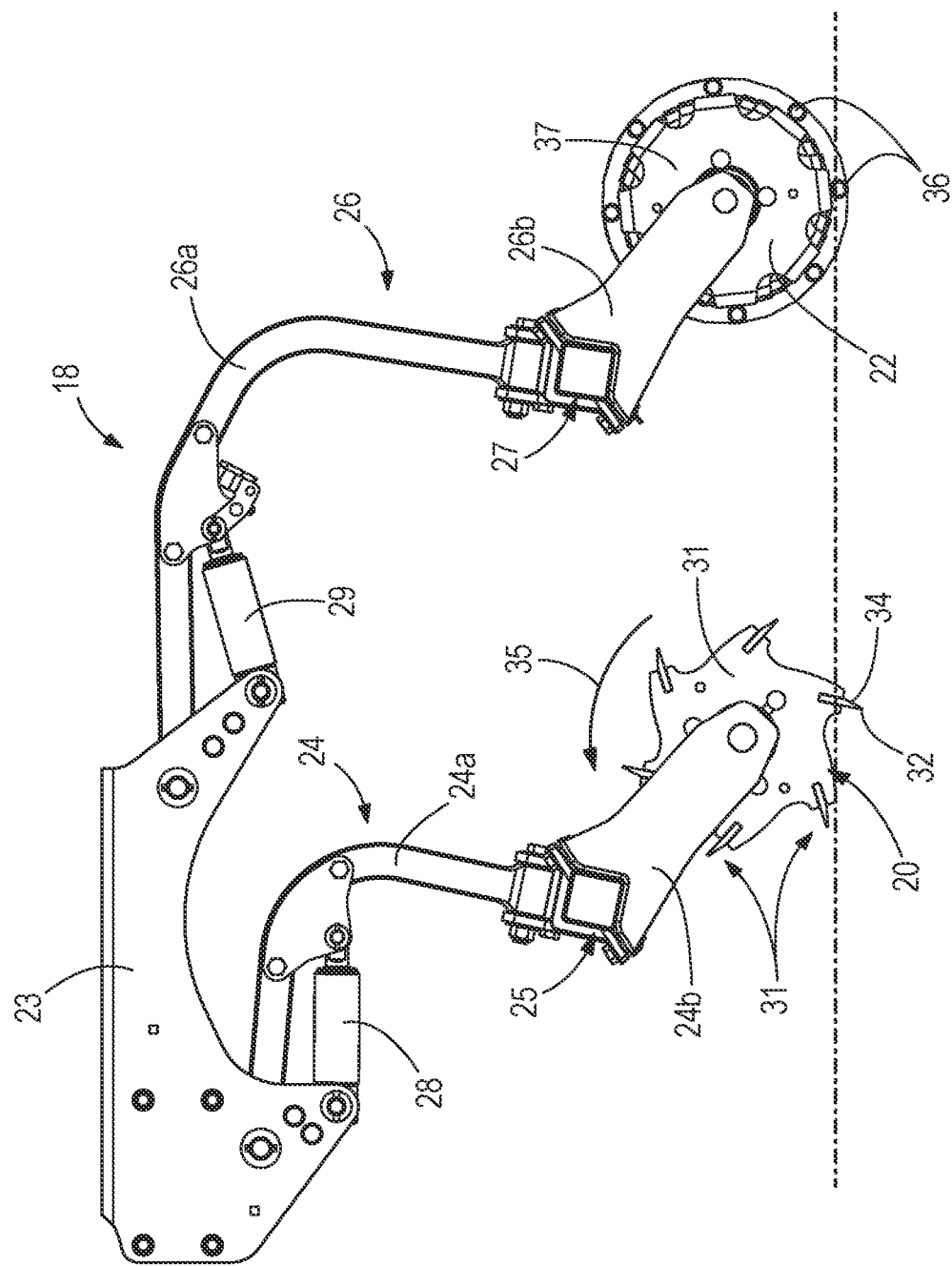
FIG. 4 is a side view of the dual basket attachment of FIG. 3.

As shown in FIGS. 3 and 4, the illustrated front basket 20 is a knife edge basket and includes six knife blades 30 held together by first end plates 31. Each knife blade 30 includes a knife blade tip 32 and a knife blade side 34. The front basket 20 is arranged to operate in a passive orientation such that soil is smoothed rather than thrown. The illustrated front basket 20 rotates in the direction of arrow 35 in response to the movement of the tractor in the direction of travel 19 (see FIG. 1). The passive orientation includes knife blades 30 arranged such that the knife blade sides 34 touch the ground before the knife blade tips 32 penetrate soil when operating in the illustrated direction of rotation 35. The knife blade tip 32 breaks up soil clods and levels soil while the knife blade side 34 firms soil.

The illustrated rear basket 22 is a pipe basket (round bar basket) having eight pipes (round bars) 36 held together by second end plates 37. Each round bar 36 further firms and levels soil. Other embodiments can include fewer or more knife blades and round bars. Some embodiments may replace the round bars with flat bars.

Figure 5:
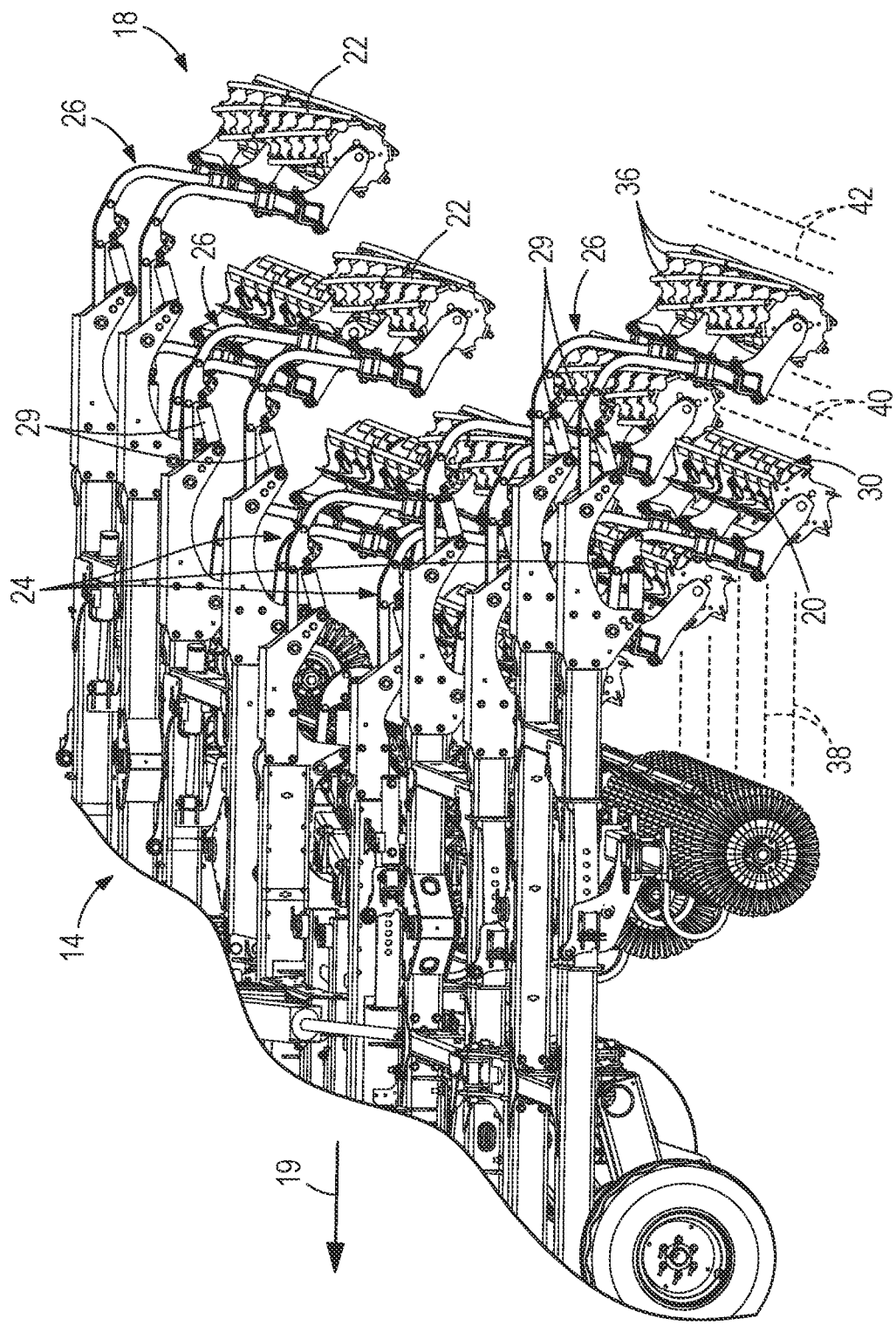
FIG. 5 is a partial perspective view of a tillage tool and a dual basket attachment in an operational position.

FIG. 5 illustrates one possible embodiment of a tillage tool 14 with a dual basket attachment 18 in operation. The illustrated knife blades 30 are straight bars but can also be spiral bars in some embodiments. The illustrated round bars 36 are spiral bars but can also be straight bars in some embodiments. The tillage tool 14 first moves over the soil and creates disc blade hills and valleys that are generally parallel to the illustrated direction of travel of the tractor as indicated by arrow 19 (some of the valleys are indicated with the reference 38 in FIG. 5). The front basket 20 then moves over the soil and reorients the disc blade hills and valleys (such as valleys 38) into knife-edge hills and valleys (such as valley 40) that are generally perpendicular to the illustrated direction of travel. The rear basket 22 then moves over the soil and levels the knife-edge hills and valleys (such as from valley 40 to valley 42), resulting in complete removal of the valleys 38 that are generally parallel to the direction of travel 19 and substantial filling in of the valleys 40 that are generally perpendicular to the direction of travel 19 as shown on the right side of FIG. 5 (see valleys 42). In some embodiments, flattening refers to a reduction in the height of the hills and depth of the valleys 40 by about fifty percent to valleys 42 but not necessarily to the extent such that the valleys 40 are completely removed from the soil. In some embodiments, the height of the hills and depth of the valleys 40 are only reduced by between about twenty five percent and about fifty percent. In some embodiments, the front and rear baskets 20, 22 cause an overall reduction in height of the hills of between about sixty six percent and about seventy five percent.

Figure 6:
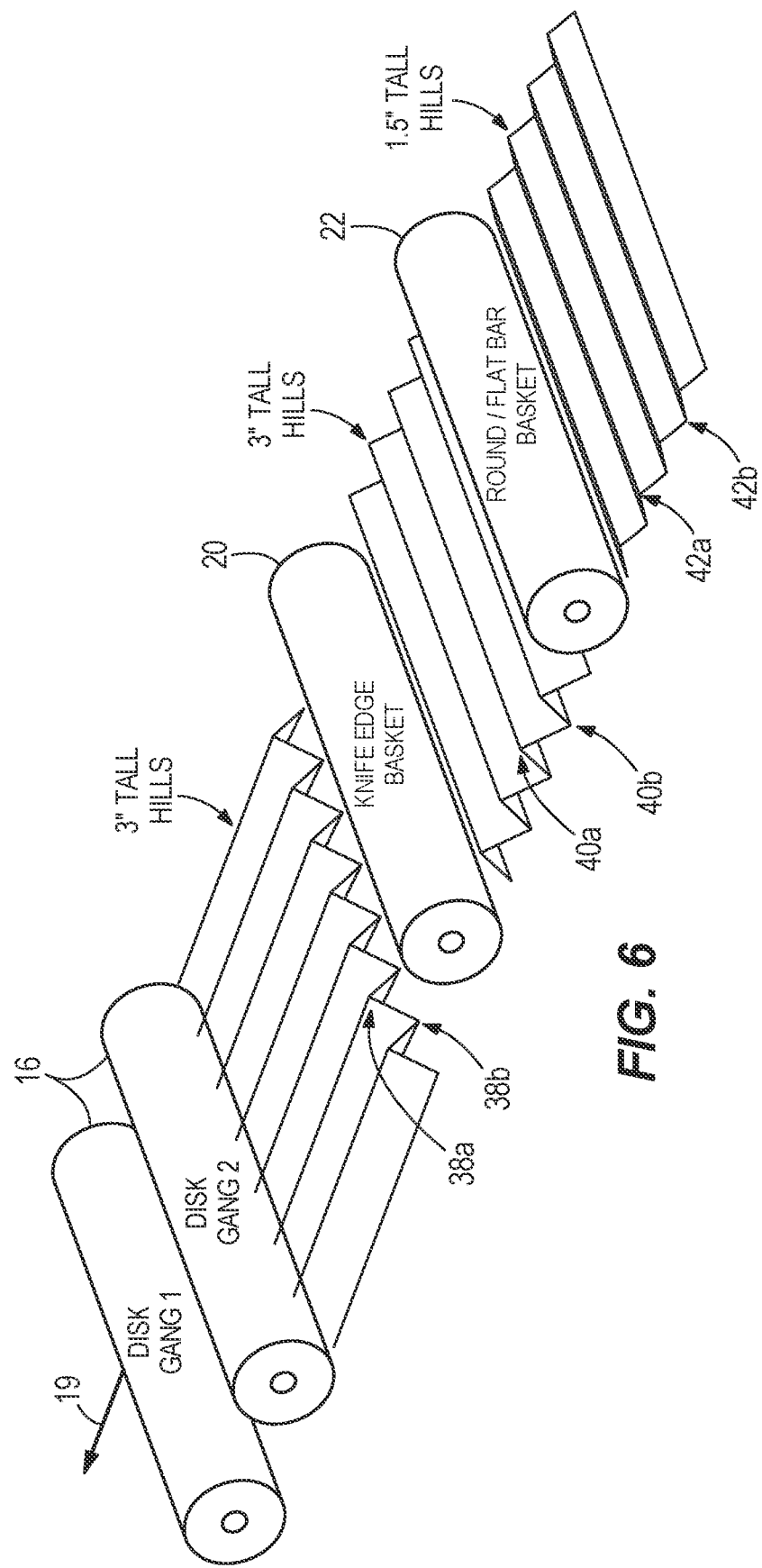
FIG. 6 is a schematic view of a soil profile according to some embodiments.

The following tables illustrate two possible examples according to some embodiments of the present invention. Table 1 and FIG. 6 show a first example which includes dry, mellow soil with minimal residue that is worked by a gang angle of four degrees. The soil height after the disk gangs 16 have worked the soil is about three inches with hills 38a having a height of about three inches above valleys 38b. The illustrated hills 38a and valleys 38b extend generally parallel to the direction of travel 19. After the front basket 20 travels across the hills 38a and valleys 38b, then hills 40a and valleys 40b that extend generally perpendicular to the direction of travel 19 are formed. The illustrated hills 40a have a height of about three inches above the valleys 40b. After the rear basket 22 travels across the hills 40a and the valleys 40b, then hills 42a and valleys 42b are formed. The hills 42a have a height of about one and a half inches above the valleys 42b. The illustrated hills 42a and valleys 42b extend substantially perpendicular to the direction of travel 19.

Figure 7:
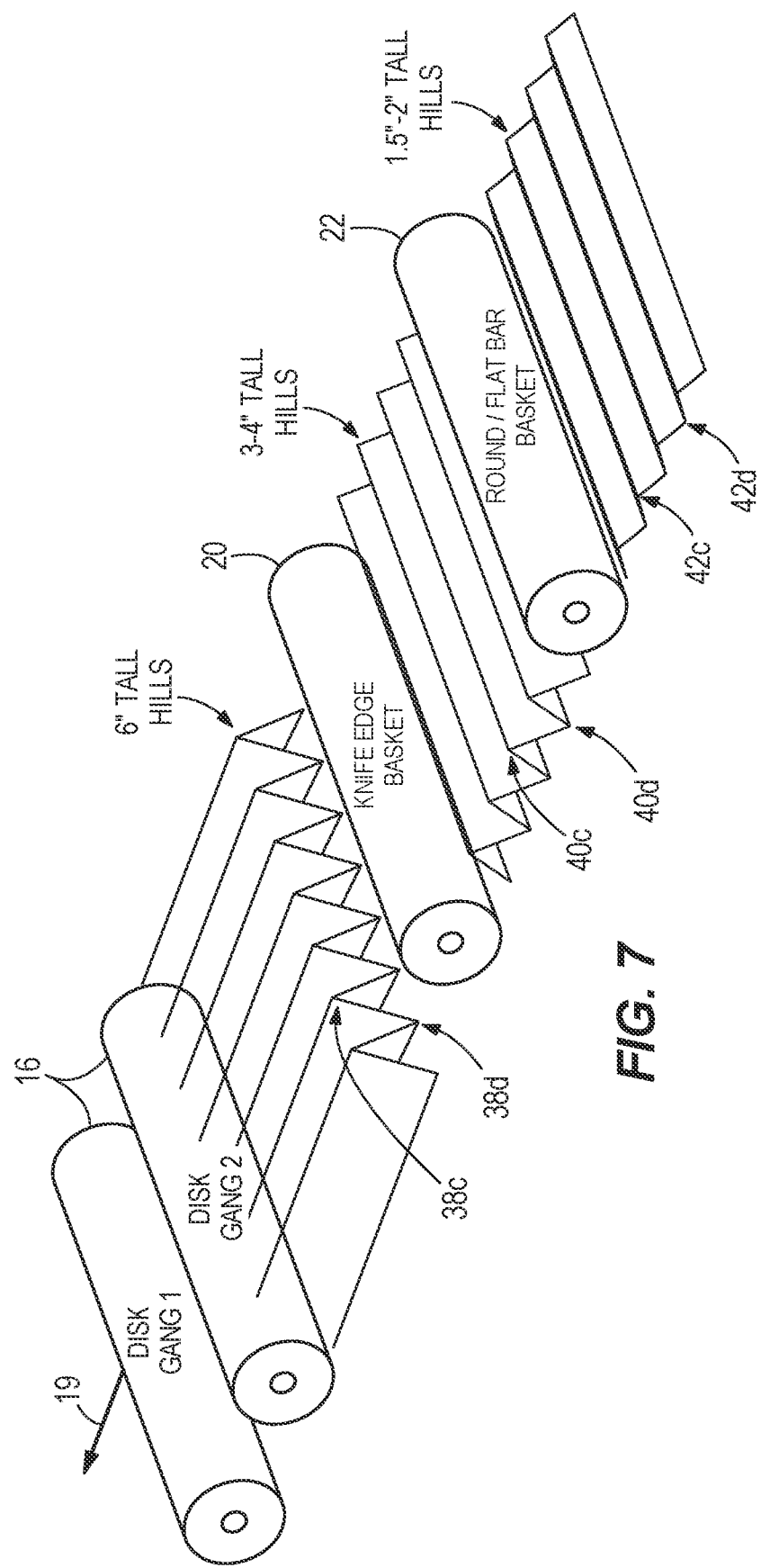
FIG. 7 is a schematic view of a soil profile according to some embodiments.

Table 2 and FIG. 7 show a second example which includes relatively wet soil with standing corn residue that is worked by a gang angle of twelve degrees. The soil height after the disk gangs 16 have worked the soil is about six inches with hills 38c having a height of about three inches above valleys 38d. The illustrated hills 38c and valleys 38d extend generally parallel to the direction of travel 19. After the front basket 20 travels across the hills 38c and valleys 38d, then hills 40c and valleys 40d that extend generally perpendicular to the direction of travel 19 are formed. The illustrated hills 40c have a height of about three or four inches above the valleys 40d. After the rear basket 22 travels across the hills 40c and the valleys 40d, then hills 42c and valleys 42d are formed. The hills 42c have a height of about one and a half to two inches above the valleys 42d. The illustrated hills 42c and valleys 42d extend substantially perpendicular to the direction of travel 19.

TABLE 1

Example 1

| | |
|---|---|
| Type of Soil | Dry, mellow soil with minimal residue |
| Gang Angle | 4 degree gang angle |
| Soil Height After Disk Blades | 3" hills parallel to the direction of travel |
| Soil Height After First Basket | 3" hills perpendicular to the direction of travel |
| Soil Height After Second Basket | 1.5" hills perpendicular to the direction of travel |
| Effect of the First Basket | Change orientation of the hills |
| Effect of the Second Basket | 50% reduction in height of the hills |
| Overall Reduction in Height | 50% reduction in height of the hills |

TABLE 2

Example 2

| | |
|---|---|
| Type of Soil | Wetter field with standing corn residue |
| Gang Angle | 12 degree gang angle |
| Soil Height After Disk Blades | 6" tall clods/rootballs generally parallel to the direction of travel |
| Soil Height After First Basket | 3"-4" hills perpendicular to the direction of travel |
| Soil Height After Second Basket | 1.5"-2" hills perpendicular to the direction of travel |
| Effect of the First Basket | Change orientation of the hills and 33-50% reduction in height of the hills |
| Effect of the Second Basket | 50% reduction in height of the hills |
| Overall Reduction in Height | 66-75% reduction in height of the hills |

Figure 8:
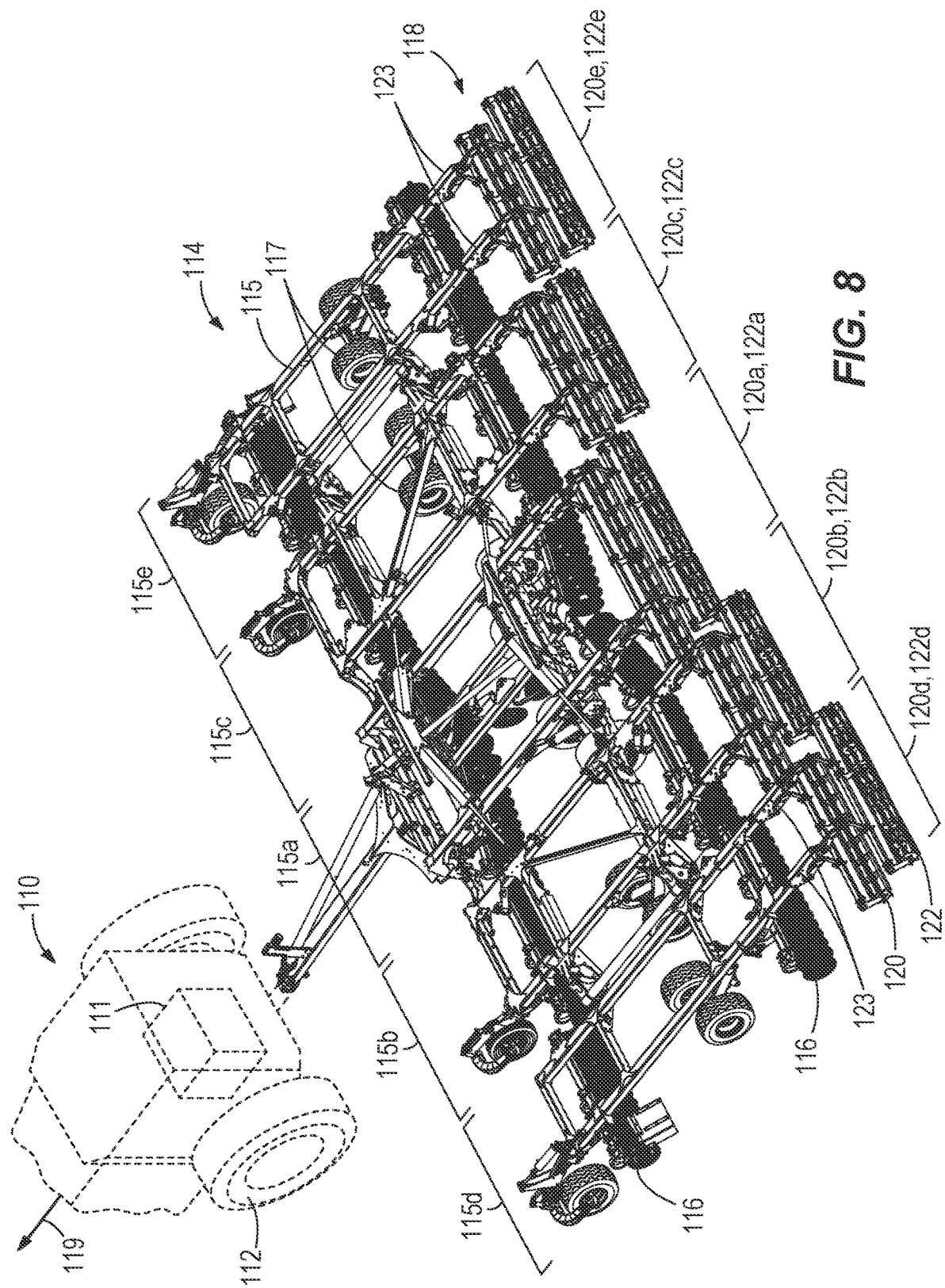
FIG. 8 is a perspective view of a tractor having a tillage tool and a dual basket attachment according to some embodiments.

FIG. 8 illustrates one possible embodiment of a tractor 110 having a motor 111, a plurality of wheels 112, a tillage tool 114, a frame 115, rows of disc gangs 116, rows of wheels 117, and a dual basket attachment 118. The illustrated frame 115 has a main portion 115a, an inner left-side or inner first lateral portion 115b, an inner right-side or inner second lateral portion 115c, an outer left-side or outer first lateral portion 115d, and an outer right-side or outer second lateral portion 115e. The disc gangs 116 are configured to create convolutions in soil such that the convolutions are oriented substantially parallel to a direction of travel 119. The dual basket attachment 118 is coupled to the back of the illustrated tillage tool 114 and includes pairs of coupling bars 123, front baskets 120, and rear baskets 122. The coupling bars 123 couple the dual basket attachment 118 to the back of the tillage tool 114. The illustrated front basket 120 and rear basket 122 have a main section 120a, 122a, an inner left-side or first inner lateral section 120b, 122b, an inner right-side or second inner lateral section 120c, 122c, an outer left-side or first outer lateral section 120d, 122d, and an outer right-side or second outer lateral section 120e, 122e. The aforementioned sections of the front basket 120 and rear basket 122 are staggered. Other embodiments of the dual basket attachment 118 can include fewer or more sections.

Figure 9:
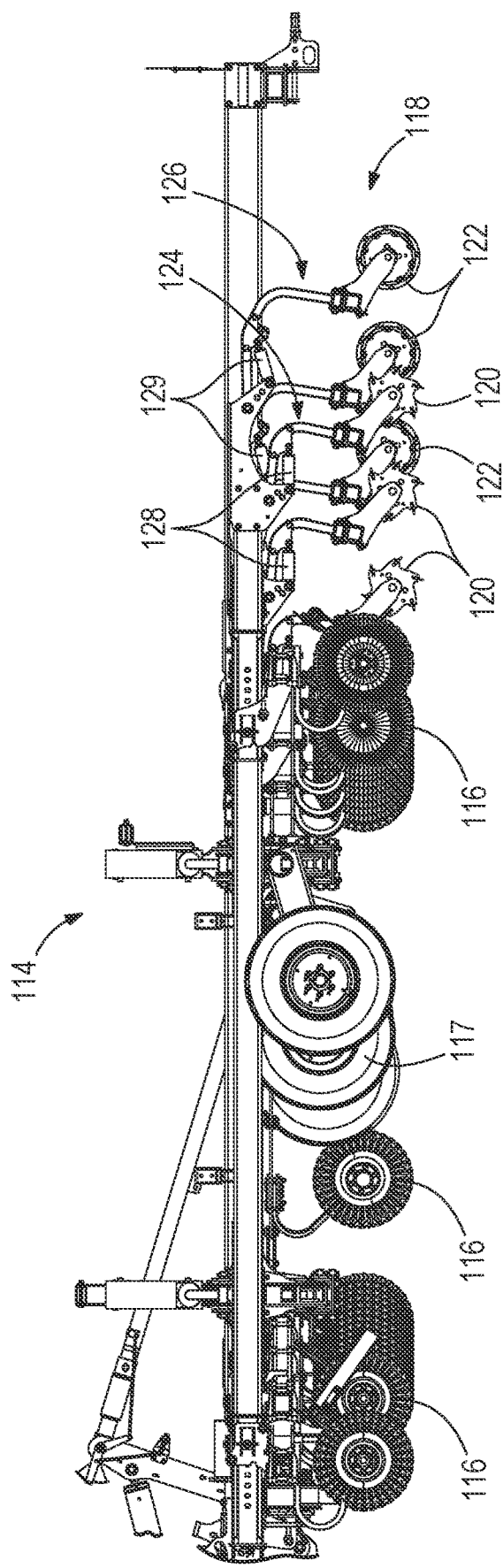
FIG. 9 is a side view of the tillage tool and dual basket attachment of FIG. 8.
Figure 10:
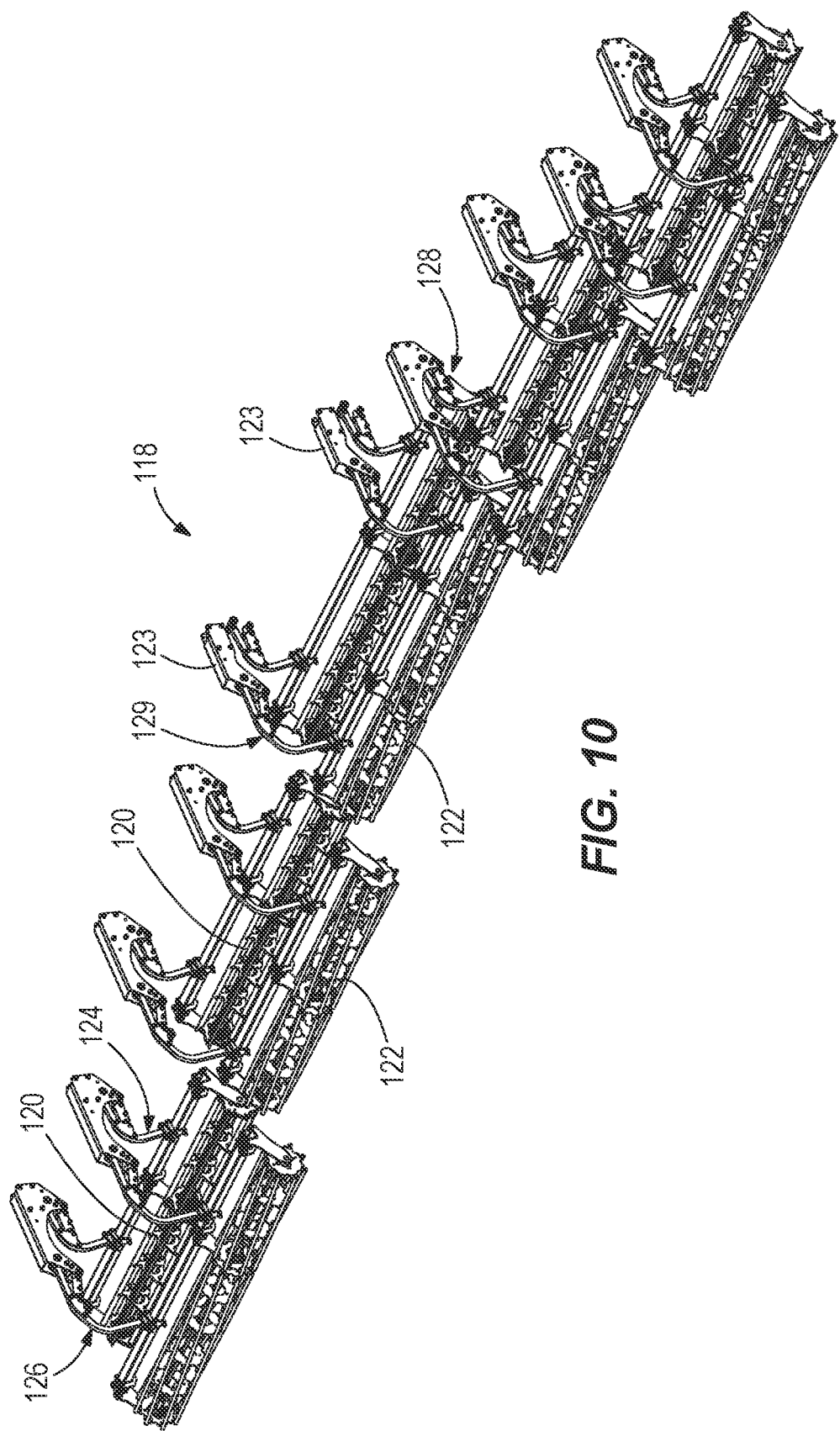
FIG. 10 is a perspective view of the dual basket attachment of FIG. 8.

FIG. 9 is a side view of the dual basket attachment 118 and the tillage tool 114. FIG. 10 illustrates the dual basket attachment 118 detached from the tillage tool 114. As shown in FIGS. 9 and 10, the front baskets 120 are coupled to the coupling bars 123 by respective first arms 124 and the rear baskets 122 are coupled to the coupling bar 123 by second arms 126. The first arms 124 are operated, respectively, by first hydraulic cylinders 128 and the second arms 126 are operated, respectively, by second hydraulic cylinders 129.

Figure 11:
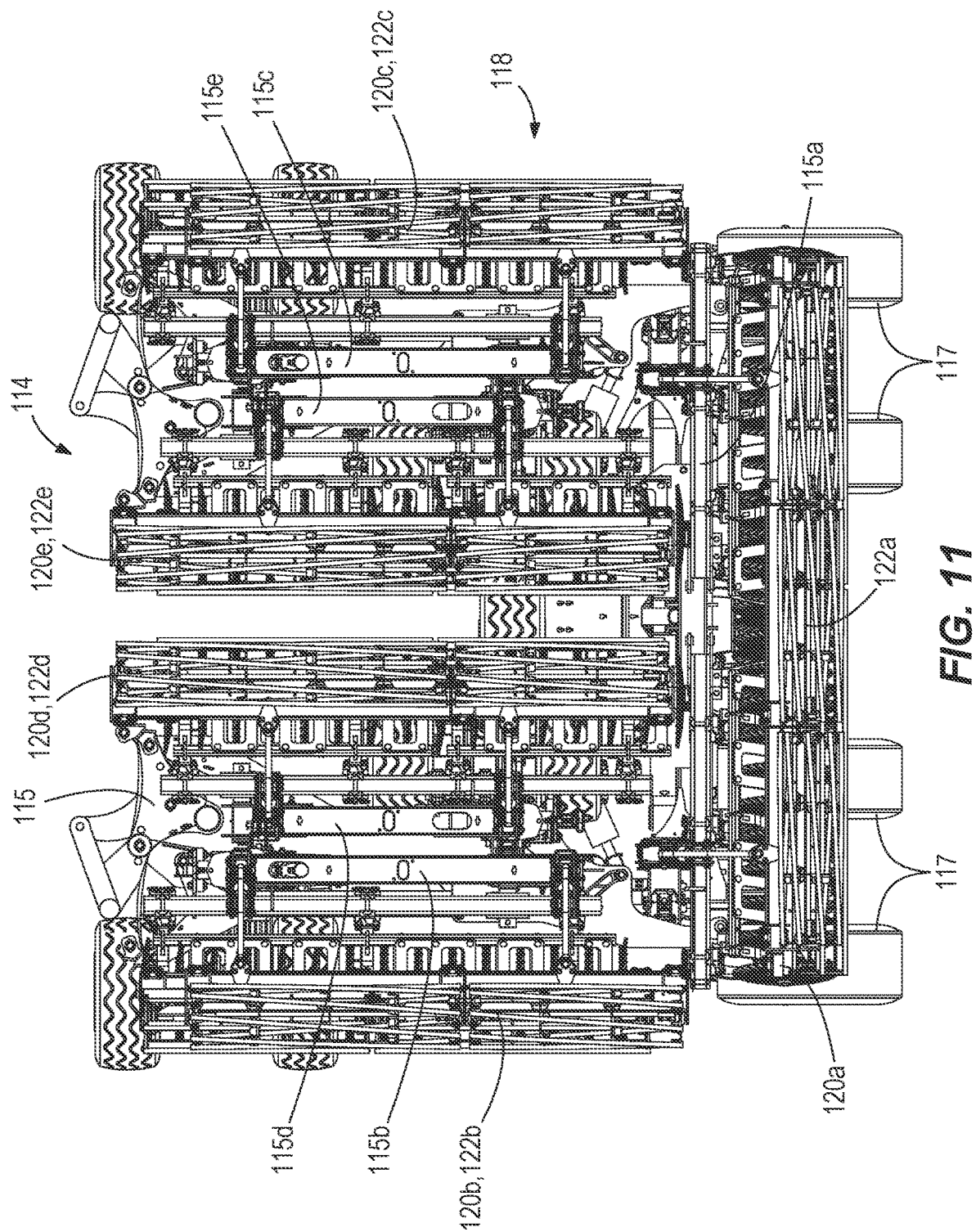
FIG. 11 is a rear view of a tillage tool including the dual basket attachment of FIG. 8 in a stowed position according to some embodiments.
Figure 12:
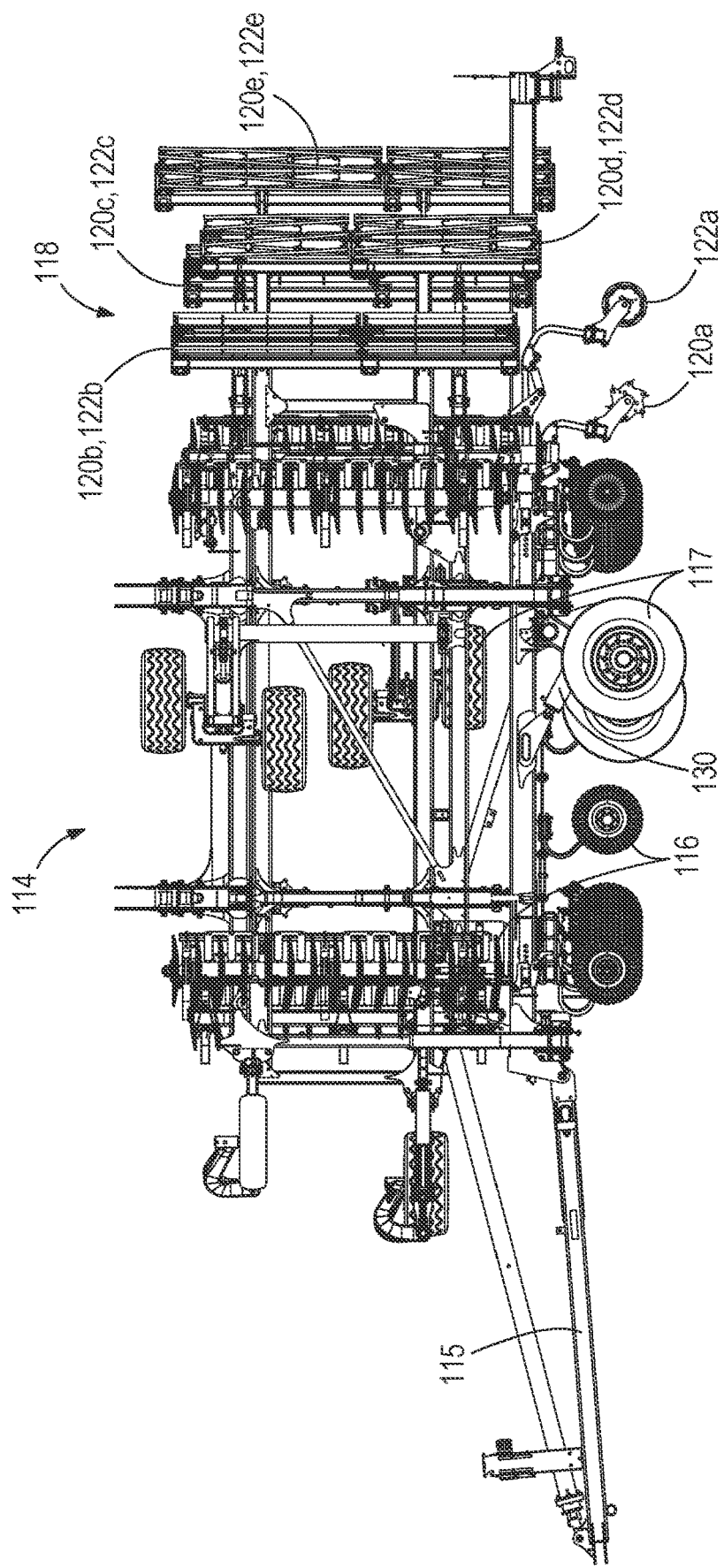
FIG. 12 is a side view of the tillage tool and dual basket attachment of FIG. 11.
Figure 13:
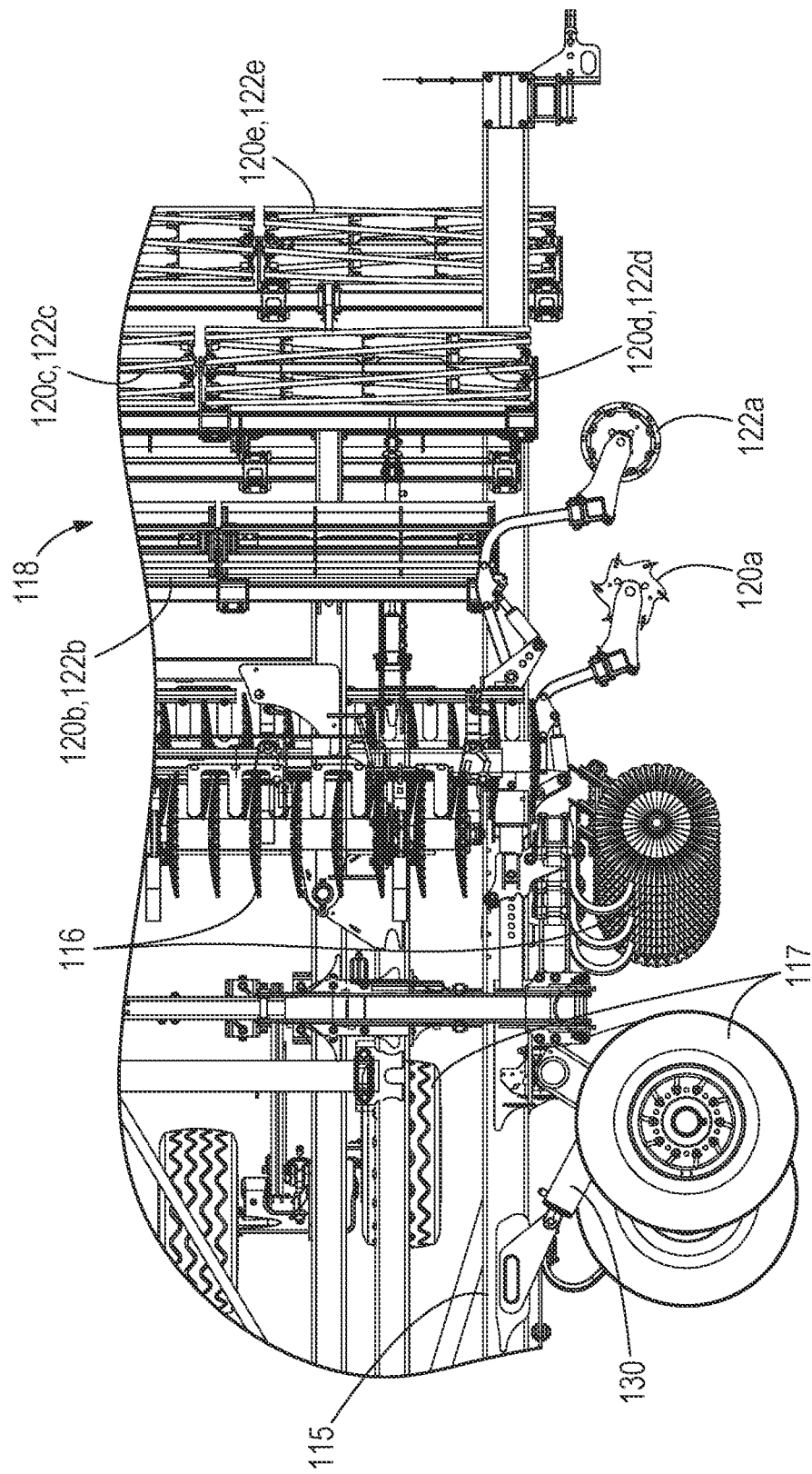
FIG. 13 is a side view of a portion of the tillage tool and dual basket attachment of FIG. 12.
Figure 14:
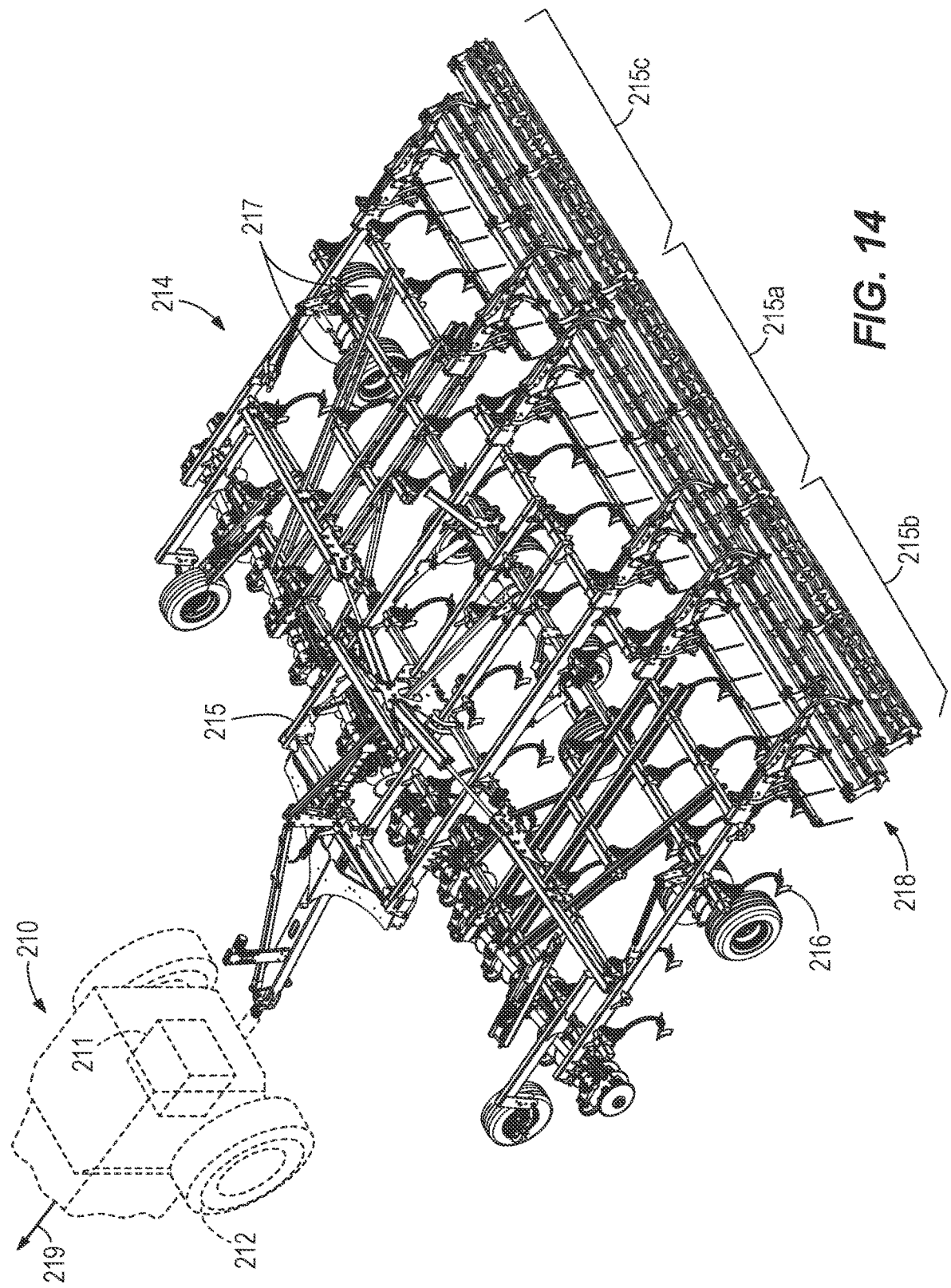
FIG. 14 is a perspective view of a tillage tool and dual basket attachment according to some embodiments.

FIGS. 11-13 illustrate one possible stowed position of the embodiment shown in FIG. 8. To move from a first, operational position to a second, stowed position, the frame 115 and the dual basket attachment 118 are first lifted up and away from the wheels 117 by the hydraulic cylinders 130 as shown in FIG. 12 to prepare for storage. Referring again to FIG. 8, from the operational position the outer first lateral portion 115d and its corresponding outer first lateral sections 120d, 122d and the outer second lateral portion 115e and its corresponding outer second lateral sections 120e, 122e are folded in towards the main portion 115a by hydraulic cylinders. The inner first lateral portion 115b and its corresponding inner first lateral sections 120b, 122b and the inner second lateral portion 115c and its corresponding inner second lateral sections 120c, 122c also are folded in towards the main portion 115a by hydraulic cylinders. All parts can be folded simultaneously by activating all of the aforementioned hydraulic cylinders at the same time or the outer parts can fold before the inner parts by activating some of the aforementioned hydraulic cylinders before others. The final stowed position of FIGS. 11-13 shows the main portion 115a and main sections 120a, 122a still generally parallel to the ground while all other portions and sections are now generally perpendicular to the ground, resulting in a compact stowed position.

FIG. 12 illustrates a deployed (or lowered) positioned of the front basket 120a and the rear basket 122a and FIG. 13 illustrates a stowed (or raised) position of the front basket 120a and the rear basket 122a. The first hydraulic cylinders 128 and second hydraulic cylinders 129 can remain activated as shown in FIG. 12 such that the first arms 124 and the front basket 120 and the second arms 126 and the rear basket 122 can still be lowered as if still in operation. The first hydraulic cylinders 128 and second hydraulic cylinders 129 can both be actuated to raise the front basket 120a and the rear basket 122a as shown in FIG. 13. The stowed position can be beneficial for traveling such that the front basket 120a and the rear basket 122a are spaced above the ground surface during traveling.

The stowed position shown in FIGS. 11-13 allows for both easy transportation and for compact storage of the tillage tool 114 and the dual basket attachment 118. In some embodiments, the inner and outer portions and sections can be stowed in positions that are not generally perpendicular to the ground including some stowed positions where the inner and outer portions and sections are parallel to the ground and positioned partially above the main portion 115a and sections 120*a*, 122*a* and some stowed positions where the inner and outer portions and section are diagonal with respect to the ground.

FIGS. 14-17 illustrate another possible embodiment of a tractor 210 having a motor 211, a plurality of wheels 212, and a tillage tool 214 including a frame 215 having a main portion 215*a*, a first left-side lateral portion 215*b*, a second right-side lateral portion 215*c*, rows of ground-engaging tillage tools 216, rows of wheels 217, and a dual basket attachment 218. The ground-engaging tillage tools 216 are configured to create convolutions in soil such that the convolutions are oriented substantially parallel to a direction of travel 219.

Figure 15:
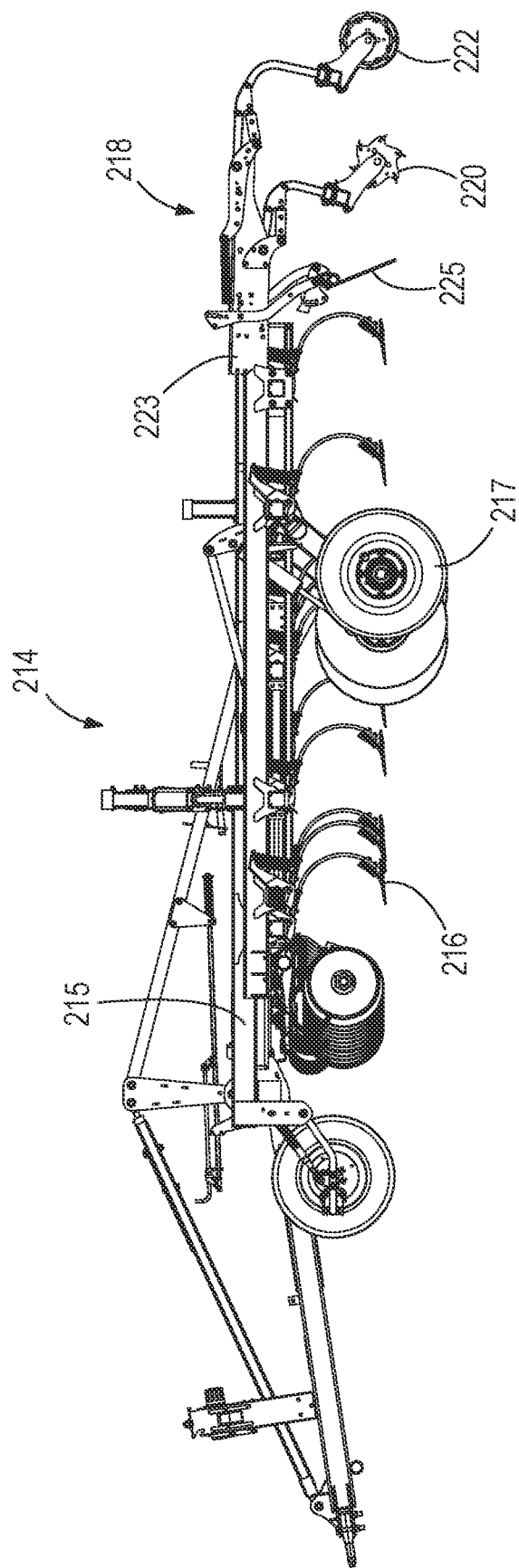
FIG. 15 is a side view of the tillage tool and dual basket attachment of FIG. 14.
Figure 16:
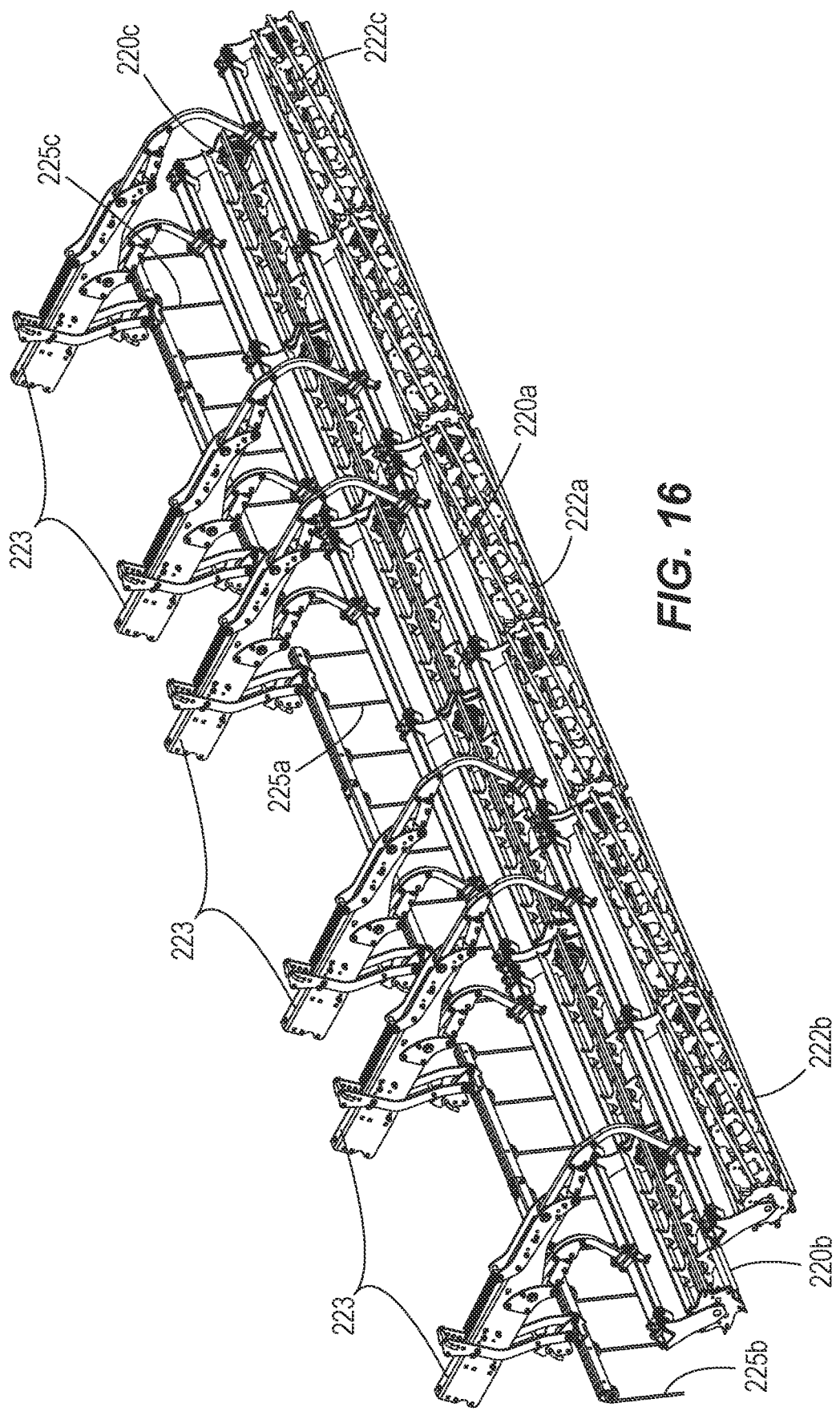
FIG. 16 is a perspective view of the dual basket attachment of FIGS. 14 and 15.
Figure 17:
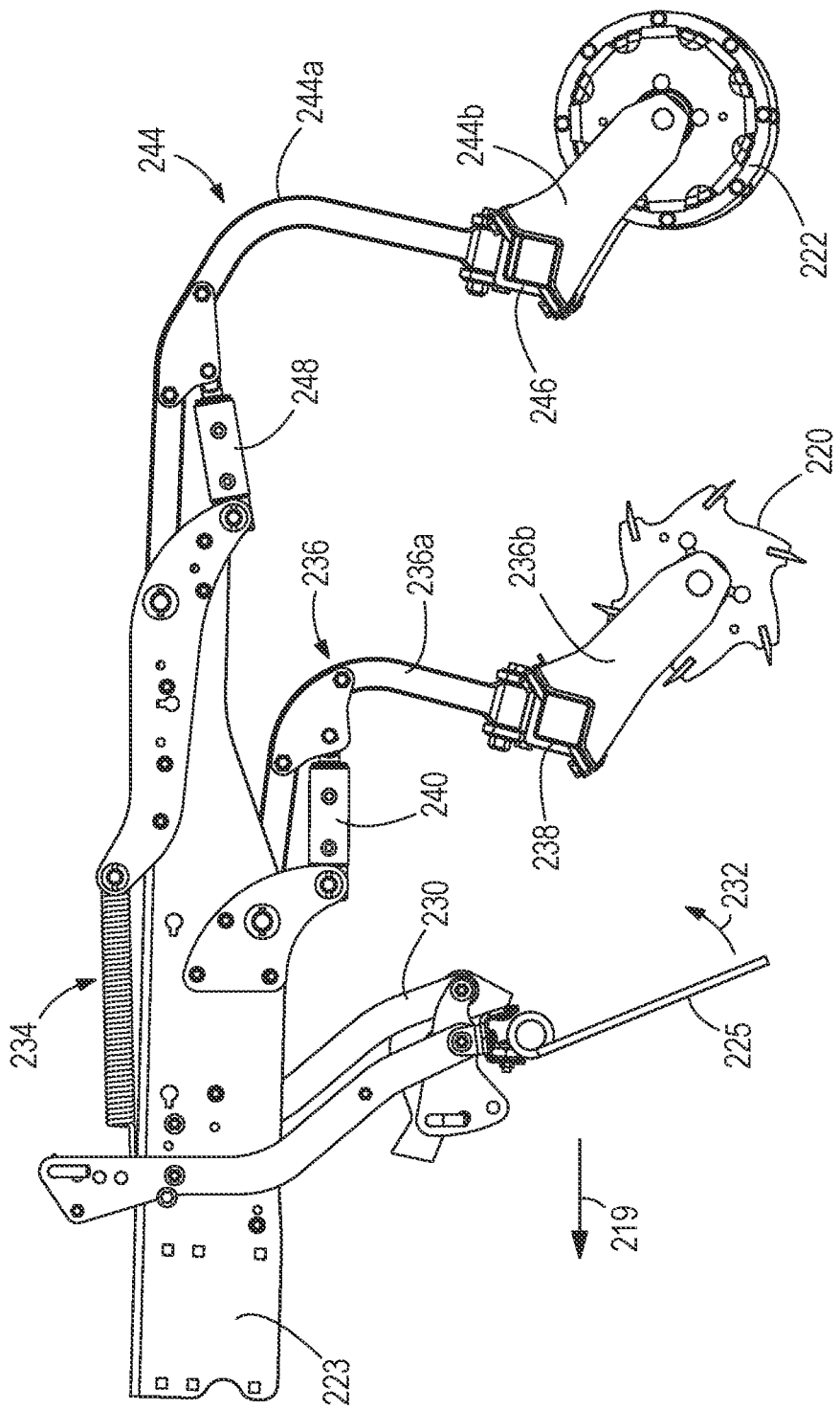
FIG. 17 is a side view of the portion of the tillage tool and dual basket attachment of FIG. 16.

As shown in greater detail in FIGS. 15-17, the dual basket attachment 218 is coupled to the back of the illustrated tillage tool 214 and includes pairs of coupling bars 223, a row of tine harrow attachments 225, front baskets 220, and rear baskets 222. The coupling bars 223 couple the dual basket attachment 218 to the back of the tillage tool 214.

With specific reference to FIG. 16, the illustrated front baskets 220, rear baskets 222 and tine harrow attachments 225 have a main section 220*a*, 222*a*, 225*a*, a first left-side lateral section 220*b*, 222*b*, 225*c*, and a second right-side lateral section 220*c*, 222*c*, 225*c*. The aforementioned sections of the front baskets 220, rear baskets 222, and tine harrow attachments 225 are generally aligned, but could be staggered in some configurations. Other embodiments of the dual basket attachment 218 can include fewer or more sections.

FIG. 17 illustrates one of the coupling bars 223 which couples one of the front baskets 220, rear baskets 222 and tine harrow attachments 225 to the vehicle 210. The illustrated tine harrow attachment 225 is coupled to the coupling bar 223 by a first arm 230. The illustrated tine harrow attachment 225 is a coil spring and is oriented at an acute angle with respect to the ground surface in the direction of travel 219. The tine harrow attachment 225 is configured to deflect in the direction of arrow 232 upon contacting one or more clumps of soil. The coil spring configuration of the tine harrow attachment 225 biases the tine harrow attachment 225 against the ground surface during operation. A second spring 234 is coupled to the coupling bar 223 and the first arm 230 to bias the tine harrow attachment 225 downward. There are a plurality of apertures on the first arm 230 to which the second spring 234 can be connected to adjust a downward biasing force of the tine harrow attachment 225.

The front basket 220 is coupled to the coupling bar 223 by a second arm 236. The illustrated second arm 236 includes a first section 236*a* and a second section 236*b* that are connected by a rocker bar 238. A first hydraulic cylinder 240 is coupled to the first section 236*a* and to the coupling bar 223. The first hydraulic cylinder 240 can raise or lower the front basket 220 with respect to the ground surface. The first hydraulic cylinder 240 can be actuated to adjust the downward force on the front basket 220 during operation as well as to move the front basket 220 to a raised position for travel.

The rear basket 222 is coupled to the coupling bar 223 by a third arm 244. The illustrated third arm 244 includes a first section 244*a* and a second section 244*b* that are connected by a rocker bar 246. A second hydraulic cylinder 248 is coupled to the first section 244*a* and to the coupling bar 223. The second hydraulic cylinder 248 can raise or lower the rear basket 222 with respect to the ground surface. The second hydraulic cylinder 248 can be actuated to adjust the downward force on the rear basket 222 during operation as well as to move the rear basket 222 to a raised position for travel.

In some embodiments of the dual basket attachment 218, the hydraulic cylinders 240 and 248 can be controlled by a single hydraulic circuit. Other possible embodiments include each set of hydraulic cylinders 240 and 248 operating separately or any of the hydraulic cylinders 240 and 248 operating individually. The hydraulic cylinders 240 and 248 can be operated by a control system within the tractor 210.

Various features and advantages of the disclosure are set forth in the following claims.

What is claimed is:

1. An implement comprising:
an implement frame;
a wheel for supporting the implement frame on a ground surface for movement in a direction of travel;
a first basket coupled to the implement frame by a first arm, the first basket configured to work a portion of the ground surface;
a second basket coupled to the implement frame by a second arm movable independent from the first arm, the second basket and positioned rearward of the first basket relative to the direction of travel, the second basket configured to work the portion of the ground surface after the first basket has worked the portion of the ground surface; and
a hydraulic cylinder operatively coupled to the first arm or the second arm and configured to move the respective basket relative to the implement frame to lift and lower the respective basket with respect to the ground surface to and from a raised position for travel, wherein in the raised position the respective basket is spaced above the ground surface, the hydraulic cylinder further configured to regulate a pressure of the respective basket against the portion of the ground surface,
wherein the respective basket is configured to be moved to the raised position by actuating the hydraulic cylinder.

2. The implement of claim 1, wherein the hydraulic cylinder is a first hydraulic cylinder operatively coupled to the first arm, the implement further comprising:
a second hydraulic cylinder operatively coupled to the second arm and configured to move the second basket relative to the implement frame to lift and lower the second basket with respect to the ground surface to and from a raised position for travel, wherein in the raised position the second basket is spaced above the ground surface, and further configured to regulate the pressure of the second basket against the portion of the ground surface,
wherein the first basket is configured to be moved to the raised position of the first basket by actuating the first hydraulic cylinder and the second basket is configured to be moved to the raised position of the second basket by actuating the second hydraulic cylinder.

3. The implement of claim 2, wherein the first and second hydraulic cylinders are controlled by a hydraulic circuit.

4. The implement of claim 2, wherein the first and second hydraulic cylinders are operable individually.

5. The implement of claim 1, further comprising a plurality of tines disposed in front of the first basket and the second basket relative to the direction of travel, wherein the second basket is disposed at a rear distal end relative to the direction of travel.

6. The implement of claim 1, wherein the first basket includes a knife edge basket and the second basket includes a pipe basket, wherein the pipe basket includes at least one round bar extending transverse to the direction of travel and configured to work the portion of the ground surface after the knife edge basket has worked the portion of the ground surface.

7. An implement comprising:
an implement frame;
a wheel for supporting the implement frame on a ground surface for movement in a direction of travel;
a first basket coupled to the implement frame by a first arm, the first basket configured to work a portion of the ground surface;
a second basket coupled to the implement frame by a second arm movable independent from the first arm, the second basket and positioned rearward of the first basket relative to the direction of travel, the second basket configured to work the portion of the ground surface after the first basket has worked the portion of the ground surface; and
a hydraulic cylinder operatively coupled to the first arm or the second arm and configured to move the respective basket relative to the implement frame to lift and lower the respective basket between a raised position for travel in which the respective basket is spaced above the ground surface, and a lowered position for operation in which the respective basket is in engagement with the ground surface,
wherein the implement is operable with one of the first basket and the second basket in the raised position and the other of the first basket and the second basket in the lowered position.

8. The implement of claim 7, wherein the hydraulic cylinder is a first hydraulic cylinder operatively coupled to the first arm and configured move the first basket relative to the implement frame to lift and lower the first basket between the raised position for travel and the lowered position for operation, the implement further comprising:
a second hydraulic cylinder operatively coupled to the second arm and configured move the second basket relative to the implement frame to lift and lower the second basket between the raised position for travel and the lowered position for operation,
wherein the first basket is configured to be moved to the raised position of the first basket by actuating the first hydraulic cylinder and the second basket is configured to be moved to the raised position of the second basket by actuating the second hydraulic cylinder.

9. The implement of claim 8, wherein the first and second hydraulic cylinders are controlled by a hydraulic circuit.

10. The implement of claim 8, further comprising a coupling bar operatively disposed between the implement frame and the first and second arms, wherein the first hydraulic cylinder is disposed between the coupling bar and the first arm, and wherein the second hydraulic cylinder is disposed between the coupling bar and the second arm.

11. The implement of claim 7, wherein the respective basket is configured to be spaced above the ground surface in the raised position and configured to be in engagement with the ground surface in the lowered position, and wherein a position of the respective basket is adjusted solely by actuating the hydraulic cylinder.

12. An implement comprising:
an implement frame;
a wheel for supporting the implement frame on a ground surface for movement in a direction of travel;
a first basket coupled to the implement frame by a first arm, the first basket configured to work a portion of the ground surface;
a second basket coupled to the implement frame by a second arm and positioned rearward of the first basket relative to the direction of travel, the second basket configured to work the portion of the ground surface after the first basket has worked the portion of the ground surface;
a first hydraulic cylinder operatively coupled to the first arm; and
a second hydraulic cylinder operatively coupled to the second arm;
wherein the first and second hydraulic cylinders are independently operable to move the respective baskets relative to the implement frame to lift and lower the respective baskets between a raised position spaced above the ground surface for travel and a lowered position in engagement with the ground surface for operation,
wherein the first basket is configured to be moved to the raised position of the first basket by actuating the first hydraulic cylinder and the second basket is configured to be moved to the raised position of the second basket by actuating the second hydraulic cylinder.

13. The implement of claim 12, wherein the implement is operable with the first basket in the raised position and the second basket in the lowered position.

14. The implement of claim 12, wherein the implement is operable with the first basket in the lowered position and the second basket in the raised position.

15. The implement of claim 12, wherein the implement is operable with the first basket in the raised position and the second basket in the raised position.

* * * * *